(12) United States Patent
Uneme (10) Patent No.: US 7,254,688 B2
(45) Date of Patent: Aug. 7, 2007

(54) DATA PROCESSING APPARATUS THAT SHARES A SINGLE SEMICONDUCTOR MEMORY CIRCUIT AMONG MULTIPLE DATA PROCESSING UNITS (75) Inventor: Masakatsu Uneme, Kanagawa (JP)

(73) Assignee: NEC Electronics Corporation, Kanagawa (JP)

(*) Notice: Subject to any disclaimer, the term of this patent is extended or adjusted under 35 U.S.C. 154(b) by 223 days.

(21) Appl. No.: 10/657,464

(22) Filed: Sep. 8, 2003

(65) Prior Publication Data
US 2004/0046611 A1  Mar. 11, 2004

(30) Foreign Application Priority Data
Sep. 11, 2002  (JP)  .............................. 2002-265326

(51) Int. Cl.
G06F 12/00  (2006.01)
(52) U.S. Cl. .................. 711/167; 711/147; 711/105; 710/240; 710/110; 710/107; 713/502; 713/600
(58) Field of Classification Search ................ 710/240, 710/244, 110, 107; 711/151, 147, 158, 105, 711/167; 713/502, 600
See application file for complete search history.

(56) References Cited
U.S. PATENT DOCUMENTS
4,212,057 A * 7/1980 Devlin et al. ............... 711/151
4,453,211 A * 6/1984 Askinazi et al. .............. 703/24
6,185,704 B1* 2/2001 Pawate et al. ............... 714/719
6,339,552 B1* 1/2002 Taruishi et al. ......... 365/189.05
6,510,099 B1* 1/2003 Wilcox et al. .......... 365/230.06
2001/0016920 A1* 8/2001 Chan ........................... 714/11
2002/0039323 A1* 4/2002 Tokutome et al. .......... 365/233
2003/0227798 A1* 12/2003 Pax ........................ 365/189.12

FOREIGN PATENT DOCUMENTS
JP        59183455 A  * 10/1984
JP          6-83780      3/1994
JP        11-272632     10/1999
JP      2000-298652     10/2000

* cited by examiner

Primary Examiner—Hong Kim
(74) Attorney, Agent, or Firm—Darryl G. Walker (57) ABSTRACT Multiple data processing circuits may share a semiconductor memory circuit, such as double-data-rate synchronous dynamic random access memory (DDR-SDRAM). A data processing circuit (202-1 or 202-2) ending control of a semiconductor memory circuit (201) supplies a clock enable signal and chip select signal at predetermined levels. A data processing circuit (202-2 or 202-1) starting control of a semiconductor memory circuit (201) supplies a clock enable signal and chip select signal at the same predetermined levels, before the data processing circuit (202-1 or 202-2) ending control stops supplying a clock enable signal and chip select signal. Therefore, a clock enable signal and chip select signal do not enter an undefined state, and malfunctions that could otherwise occur are prevented.

12 Claims, 4 Drawing Sheets

DATA PROCESSING APPARATUS THAT SHARES A SINGLE SEMICONDUCTOR MEMORY CIRCUIT AMONG MULTIPLE DATA PROCESSING UNITS

TECHNICAL FIELD

The present invention relates to generally to a data processing apparatus that includes a semiconductor circuit and a data processing circuit, and more particularly to a data processing apparatus in which a semiconductor memory circuit is shared among multiple data processing circuits.

BACKGROUND OF THE INVENTION

Conventionally, a data processing apparatus is known that uses a sharing arbitration circuit. The sharing arbitration circuit can arbitrate the sharing of a semiconductor memory circuit among multiple data processing circuits. Examples of such conventional data processing apparatuses are shown in Japanese Patent Publication JP 06-83780A, JP 11-272632A, and JP 2000-298652A.

Figure 4:
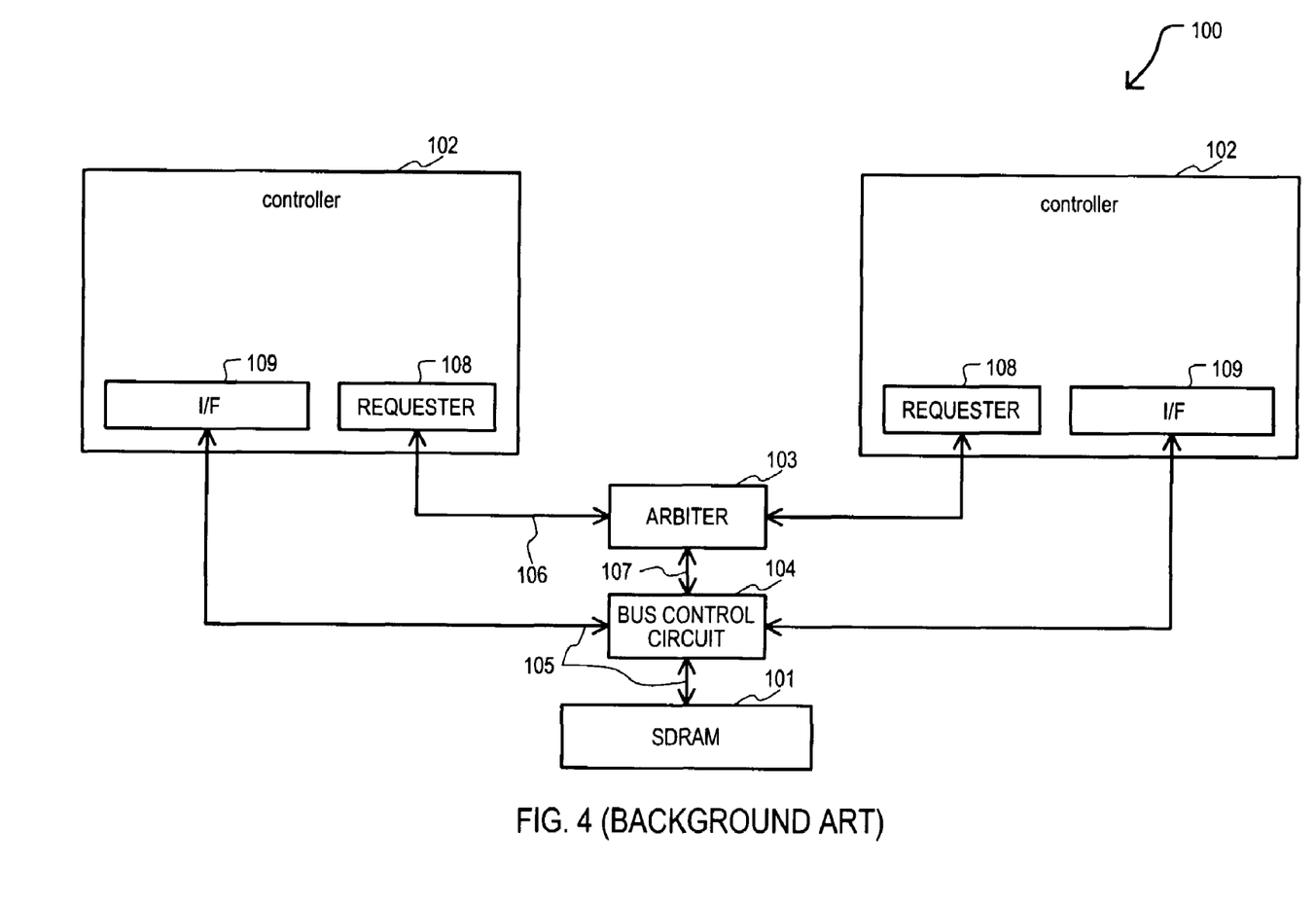
FIG. 4 is a block diagram showing a conventional data processing apparatus.

Referring to FIG. 4, a conventional example of a data processing apparatus described above is shown, and designated by the general reference character 100. A data processing apparatus 100 can include a synchronous dynamic random access memory (SDRAM) 101 provided as a semiconductor memory device, two data processing circuits 102, constituted by one-chip microcomputers, an arbiter circuit 103 operating as a sharing arbitration circuit, and a bus control circuit 104.

The SDRAM 101 and two data processing circuits 102 are connected through system buses 105 having bus controller 104 at the center. Data processing circuits 102 are connected with arbiter circuit 103 through dedicated signal lines 106. Arbiter circuit 103 is connected with bus control circuit 104 through a dedicated signal line 107.

A requester circuit 108 and interface (I/F) circuit 109 are built into each data processing circuit 102. Requester circuits 108 are in signal communication with arbiter circuit 103, and I/F circuits are in signal communication with SDRAM 101 through system bus 105. A clock oscillation circuit (not shown) is provided to data processing apparatus 100 independently of the arrangement described above, and this clock oscillation circuit supplies the individual parts of the data processing apparatus 100 with a common clock signal.

In the conventional data processing apparatus 100 described above, the SDRAM 101 executes data reads and data writes in response to command signals and address signals received external to the SDRAM 101 by way of system bus 105. Such operations are conducted in synchronism with the clock signal received externally from the clock oscillation circuit.

It is noted that in the conventional example shown in FIG. 4, because two data processing circuits 102 are connected to a single SDRAM 101, it is necessary to selectively connect one data processing circuit 102 with the SDRAM 101 according to a control operation. In particular, in the data processing apparatus 100 of FIG. 4, arbiter circuit 103 controls the operational state of the two data processing circuits 102 and controls the operation of bus control circuit 104 to selectively connect one of the two data processing circuits 102 with the SDRAM 101.

In the conventional data processing apparatus 100 described above, because bus control circuit 104, controlled by the arbiter circuit 103, selectively connects one of the two data processing circuits 102 with the SDRAM 101, it is possible for the two data processing circuits 102 to share the SDRAM 101.

Thus, bus control circuit 104 is conventionally considered necessary for switching a connection between data processing circuits 102 and a shared single SDRAM 101. However, such a circuit increases overall circuit scale (e.g., size). Further, the bus control circuit 104 can decrease overall operating speed, as such a circuit introduces a switching delay into data access operations.

To address the above drawbacks of the conventional approach, one may consider eliminating the bus control circuit 104 and directly connecting the data processing circuits 102 and SDRAM 101 by way of system bus 105. Operations of the multiple data processing circuits 102 could then be arbitrated according to arbiter circuit 103. However, such an approach may be difficult to implement.

For example, when a double data rate (DDR)—SDRAM is used as a semiconductor memory circuit, the DDR-SDRAM operates at a high speed in synchronism with the rise and fall of a clock signal. Thus, it is necessary to change a control signal supplied form the data processing circuits to the DDR-SDRAM from a high electric potential (such as VDD) to a low electric potential (such as GND) with respect to center reference level (such as ½ VDD).

In such a proposed conventional arrangement, when the supply of a control signal is interrupted by switching of the data processing circuit currently controlling the DDR-SDRAM, the DDR-SDRAM can misinterpret the undefined state of the control signal as high or low. This can result in the malfunction of the DDR-SDRAM. Thus, in a data processing apparatus that shares a DDR-SDRAM among multiple data processing circuits 102, because it may not be possible to eliminate a bus control circuit 104, such a data processing apparatus suffers from increased circuit size. At that same time, as noted previously, response speed decreases due to the presence of the bus control circuit 104.

In light of the above, it would be desirable to arrive at some way of enabling a semiconductor memory circuit to be shared among multiple data processing circuits without the use of a bus control circuit. At the same time, such a solution should not suffer from the potential malfunctions that can occur in conventional arrangements.

SUMMARY OF THE INVENTION

The present invention may include a data processing apparatus that arbitrates sharing of a single semiconductor memory circuit among multiple data processing circuits. The data processing apparatus can include a semiconductor memory circuit that executes operations corresponding to a command signal, address signals, and clock signal received external to the a semiconductor memory circuit. A data processing circuit can supply a semiconductor memory circuit with clock enable signal for enabling an input of the clock signal when active and a disabling the input of the clock signal when inactive, and a chip select signal for enabling input of command signals when the chip select signal is active and disabling input of command signals when the chip select signal is inactive. Before a data processing circuit ends control of the semiconductor memory circuit and stops supplying the clock enable signal and chip select signal, a data processing circuit starting control of the semiconductor memory circuit supplies clock enable signal and chip select signal values at the same state as those provided by the data processing circuit ending control of the semiconductor memory circuit.

Accordingly, in a data processing apparatus according to the present invention, a clock enable signal and chip select signal supplied to the semiconductor memory circuit do not enter an undefined state.

According to one aspect of the embodiments, a data processing circuit can supply a sharing arbitration circuit with a request signal when requesting control of the semiconductor memory circuit, can control the semiconductor memory circuit in response to grant signal, and can supply the arbitration circuit with a busy signal while controlling the semiconductor memory circuit. When ending control of the semiconductor memory circuit, a data processing circuit can stop supplying a clock enable signal and chip select signal a predetermined time after stopping the supply of the busy signal. A sharing arbitration circuit can generate a grant signal in response the request signal before the predetermined time has elapsed.

According to another aspect of the embodiments, a semiconductor memory can enter a lower power state when the clock enable signal is inactive, than a state when the clock enable signal is active.

According to another aspect of the embodiments, one of multiple data processing circuits can be a master device while any other data processing circuits are slave devices. A master device can supply a clock enable signal and chip select signal to the semiconductor memory circuit when none of the slave devices provides the clock enable signal and chip select signal to the semiconductor memory circuit.

According to another aspect of the embodiments, multiple data processing circuits can be connected to one another, but formed independently of one another.

According to another aspect of the embodiments, one of the multiple data processing circuits can be a master device, while any others are slave devices. Further, a sharing arbitration circuit is built into the master device.

According to another aspect of the embodiments, each data processing circuit of multiple data processing circuits can include a built in sharing arbitration circuit. The multiple data processing circuits can be initialized to establish one data processing circuit as a master device and all others as slave devices. In addition, the arbitration circuit of the master device can be enabled.

According to another aspect of the embodiments, in an initialization, a sharing arbitration circuit built into a master device can supply at least one slave device with a grant signal. At least one slave device can supply a request signal of a predetermined time period if the grant signal is received while the slave device is not supplying its own request signal. Further, a sharing arbitration circuit built into the master device can stop supplying the grant signal once the start up of at least one slave device is confirmed by input of the request signal from the at least one slave device.

The present invention may also include a data processing apparatus including a semiconductor memory circuit that is controlled by inputs to at least one control input. At least one control line can be coupled to the control input of the semiconductor memory circuit. A plurality of data processing circuits can share access to the semiconductor memory circuit. Each data processing circuit can have a control output coupled to the control line. When one data processing circuit ends control of the semiconductor memory circuit, the data processing circuit can provide a control signal at the control output of a predetermined potential for a first time period before ending the control output. When one data processing circuit starts control of the semiconductor memory circuit, the data processing circuit can provide a control signal at its control output at the predetermined potential within the first time period.

According to one aspect of the embodiments, a semiconductor memory circuit can operate in synchronism with a clock signal, and the at least one control input can include a chip select input that enables the processing of commands by the semiconductor memory circuit, and a clock enable signal that enables generation of timing signals within the semiconductor memory circuit.

According to another aspect of the embodiments, each of the plurality of data processing circuits can include a request input/output (I/O) for indicating when the data processing circuit seeks control of the semiconductor memory circuit, a grant I/O for indicating when the data processing circuit is granted control of the semiconductor memory circuit, and a busy I/O for indicating when the data processing circuit is controlling the semiconductor memory circuit.

According to another aspect of the embodiments, each of the plurality of data processing circuits can include a first switch for selectively connecting the request I/O, grant I/O, and busy I/O to a requesting circuit that generates a request indication and busy indication for the data processing circuit, and a second switch for selectively connecting the request I/O, grant I/O, and busy I/O to an arbitration circuit that generates a grant indication. The first switch can be disabled and the second switch enabled when the data processing circuit is initialized as a master device. The first switch can be enabled and the second switch disabled when the data processing circuit is initialized as a slave device.

According to another aspect of the embodiments, each data processing circuit can include a controller that generates at least one control signal for enabling or disabling a first switch and second switch according to initialization data.

According to another aspect of the embodiments, at least one control line is directly connected to the control input of the semiconductor memory circuit and the control output of each of the plurality of data processing circuits.

It is understood that the various components of a data apparatus according to the present invention need not be formed independently of one another. Multiple components may be formed as single member, one component may be part of another component, or certain components may overlap part of another component.

The present invention can also include a method of sharing a semiconductor memory circuit with a plurality of data processing circuits. The method can include, when a data processing circuit ends control of the semiconductor memory circuit, driving control outputs coupled to control lines to predetermined logic values, and subsequently placing the control outputs in a high impedance state. In addition, when a data processing circuit starts control of the semiconductor memory circuit, driving control outputs coupled to control lines to the predetermined logic values prior to the control outputs of the semiconductor device that is ending control of the semiconductor memory circuit being placed in the high impedance state.

According to one aspect of the embodiments, a semiconductor memory circuit and data processing circuit can operate in synchronism with a clock signal. When the data processing circuit ends control of the semiconductor memory circuit, the data processing circuit can place the control outputs in the high impedance state a first number of clock cycles after ceasing operating with the semiconductor memory circuit. When the data processing circuit starts control of the semiconductor memory circuit, the data processing circuit can drive control outputs to the predetermined logic values a second number of clock cycles after the data processing circuit that is ending control ceases operating with the semiconductor memory circuit. The second number of clock cycles can be less than the first number of clock cycles. In particular, a second number of clock cycles can be one and the first number of clock cycles can be two.

According to another aspect of the embodiments, when a data processing circuit initializes as a master device, the data processing circuit can output a grant control signal. When a data processing circuit initializes as a slave device, the data processing circuit can output a request signal, having a predetermined duration, after receiving a grant signal from the master device, and places control outputs of the slave device in the high impedance state.

According to another aspect of the embodiments, when the data processing circuit ends control of the semiconductor memory circuit, the data processing circuit can set a busy signal to an inactive state, and subsequently place control outputs to a high impedance state.

According to another aspect of the embodiments, when a data processing circuit seeks control of the semiconductor memory circuit, the data processing circuit can activate a request signal, and if a corresponding grant signal is activated, the data processing circuit can subsequently drive control outputs to the predetermined logic values.

DETAILED DESCRIPTION OF THE EMBODIMENTS

Various embodiments of the present invention will now be described in detail with reference to accompanying drawings. The examples described below can include various constituents that are identical, or essentially the same as those of the conventional data processing apparatus shown in FIG. 4.

Figure 1:
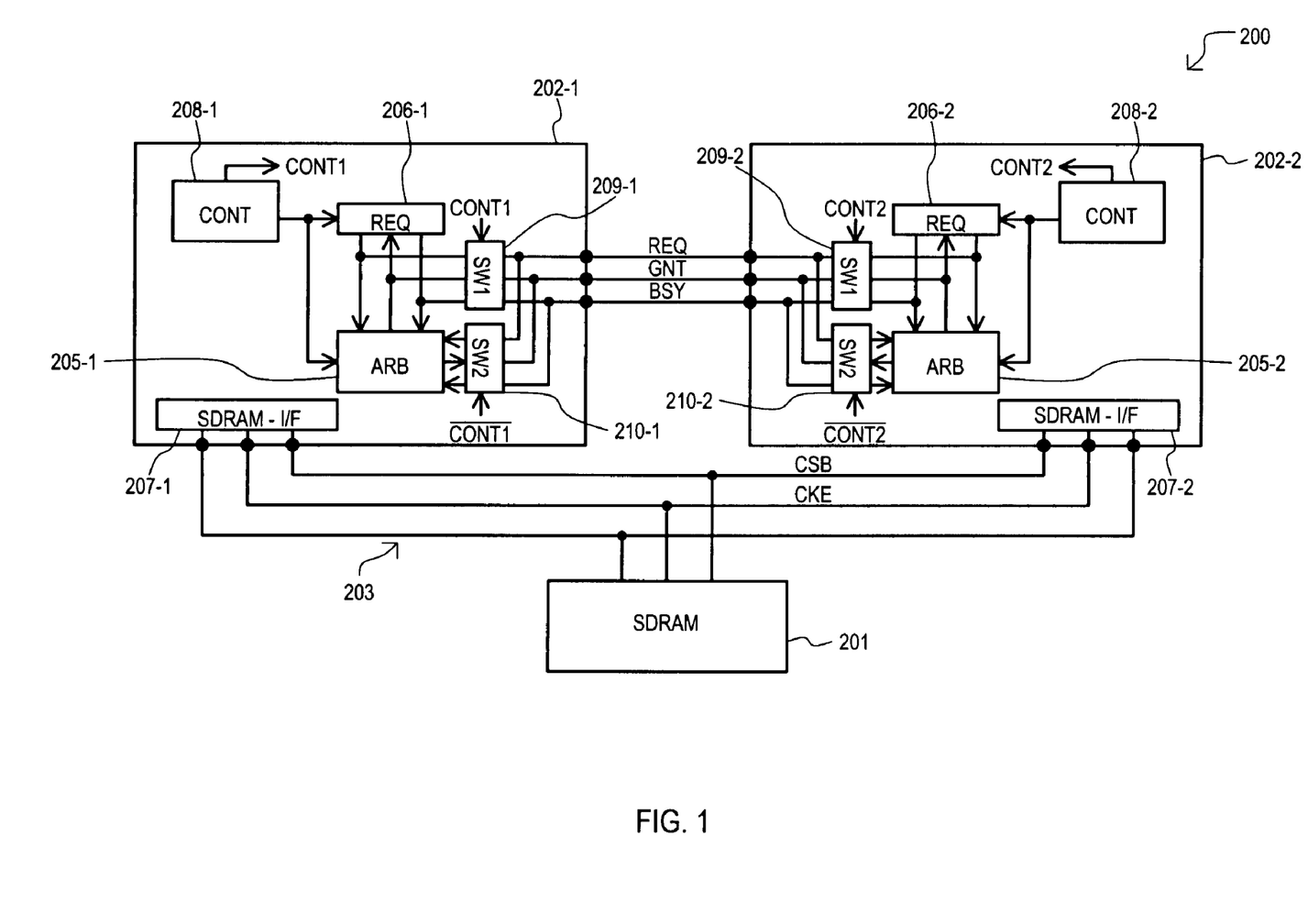
FIG. 1 is a block diagram showing a data processing apparatus according to one embodiment of the present invention.

Referring now to FIG. 1, a data processing apparatus according to one embodiment of the present invention is set forth in block schematic diagram and designated by the general reference character 200. A data processing apparatus 200 can include a semiconductor memory circuit, which in this case is a DDR-SDRAM 201, and data processing circuits 202-1 and 202-2. Data processing circuits (202-1 and 202-2) can be connected with DDR-SDRAM 201 by way of system bus 203.

System bus 203 can transmit a chip select signal CSB, a clock enable signal CKE, and other signals (including command and address signals). In addition, it is assumed that a clock oscillator (not shown) for data processing apparatus 200 can supply SDRAM 201 and data processing circuits (202-1 and 202-2) with a clock signal.

Data processing circuits (202-1 and 202-2) can have the same structure. Thus, while the following description will describe various items within data processing circuit 202-1, it is understood that such items can be repeated within data processing circuit 202-2. Data processing circuit 202-1 can include an arbiter 205-1, a requester 206-1, an I/F circuit 207-1, a controller 208-1, and switches 209-1 and 210-1.

The following section will describe the initialization of a data processing circuit 202-1. A data processing circuit 202-1 can be initialized as a "master" or "slave" device according to a register in controller 208-1. If a register within controller 208-1 indicates the device is a master device, arbiter 205-1 can be activated, and essentially simultaneously, a control signal CONT1 can be supplied as an output. Control signal CONT1 (and its inverse) can essentially simultaneously deactivate switch 209-1 and activate switch 210-1. When a slave device is indicated, control signal CONT1 (and its inverse) can essentially simultaneously activate switch 209-1 and deactivate switch 210-1.

A data processing apparatus 202-1, set as a master device, can supply a grant signal GNT from arbiter 205-1 through switch 210-1. This can confirm that the other data processing apparatus 202-2 is set as a slave device. Requester 206-2 can receive such a master device issued grant signal GNT by way of switch 209-2 within data processing circuit 202-2 operating as a slave device (e.g., on a slave side).

Requester 206-2, on the slave side, can be set by reception of a grant signal GNT from a master device. In particular, if such a grant signal is received, while the slave side requester 206-2 is not supplying a request signal, the slave side requester 206-2 can supply a request signal REQ for a predetermined clock period (such as one clock period). In this way, it is possible to confirm the start up of a data processing circuit 202-2 on a slave side based on the presence or absence of a request signal REQ from the slave side in response to a grant signal GNT from a master side.

Confirmation of the startup of a data processing circuit 202-2 on a slave side can prevent a malfunction from occurring due to a request signal generated by noise, or the like, to arbiter 205-1 on a master side before start up. Arbiter 205-1 on the master side can be controlled so as to receive a signal from the slave side after the arbiter confirms the start up of the slave data processing circuit (in this example 202-2).

Figure 3:
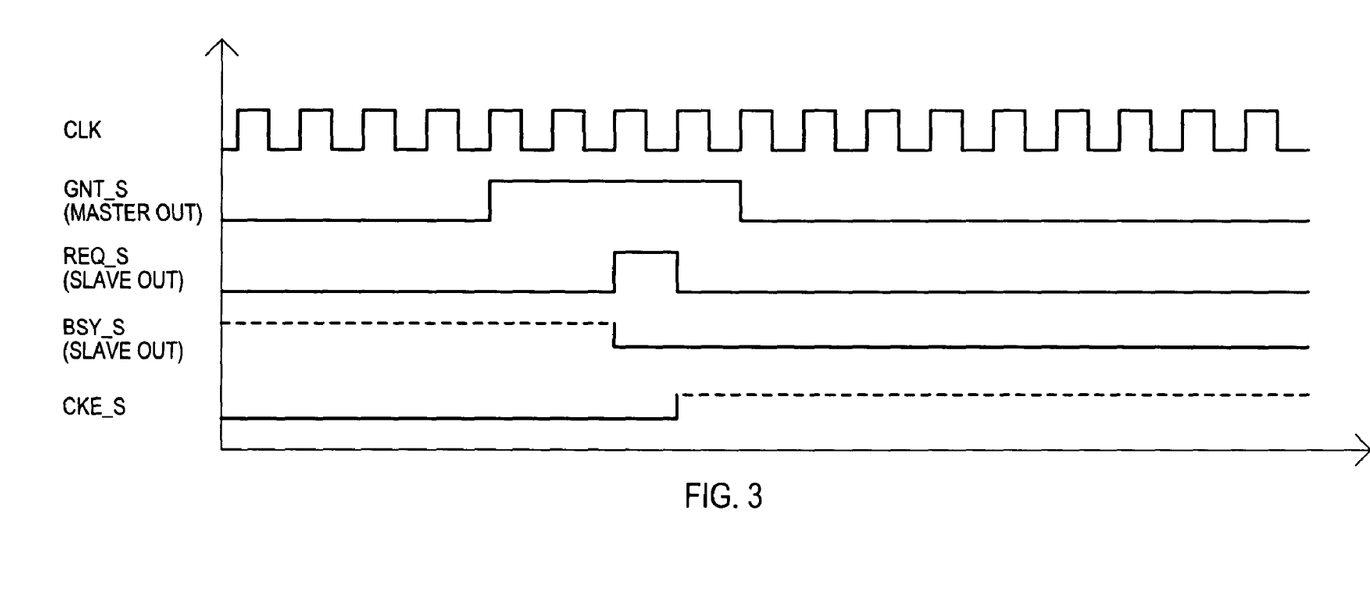
FIG. 3 is a timing diagram showing the response of various signals during an initialization of a data processing apparatus like that of FIG. 1.

One particular example of an initialization operation is shown in FIG. 3. FIG. 3 shows a clock signal CLK, master grant signal GNT_S, slave request signal REQ_S, slave busy signal BSY_S, and slave clock enable signal CKE_S. A clock signal CLK may be supplied to data processing circuits (202-2 and 202-2) and semiconductor memory circuit. A master grant signal GNT_S can output from a master device to a slave device upon initialization. A slave request signal REQ_S may be issued from the slave device to the master device in response to the master grant signal GNT_S, provided the slave device is not receiving a request. The slave request signal REQ_S of FIG. 3 has a predetermined duration of one clock period. The slave busy signal BSY_S can indicate that the slave does not have control of the semiconductor memory circuit. The slave clock enable signal CKE_S is shown to start at an inactive level (low, in this example), and then transition to a high impedance state once the device is successfully initialized as a slave device.

Figure 2:
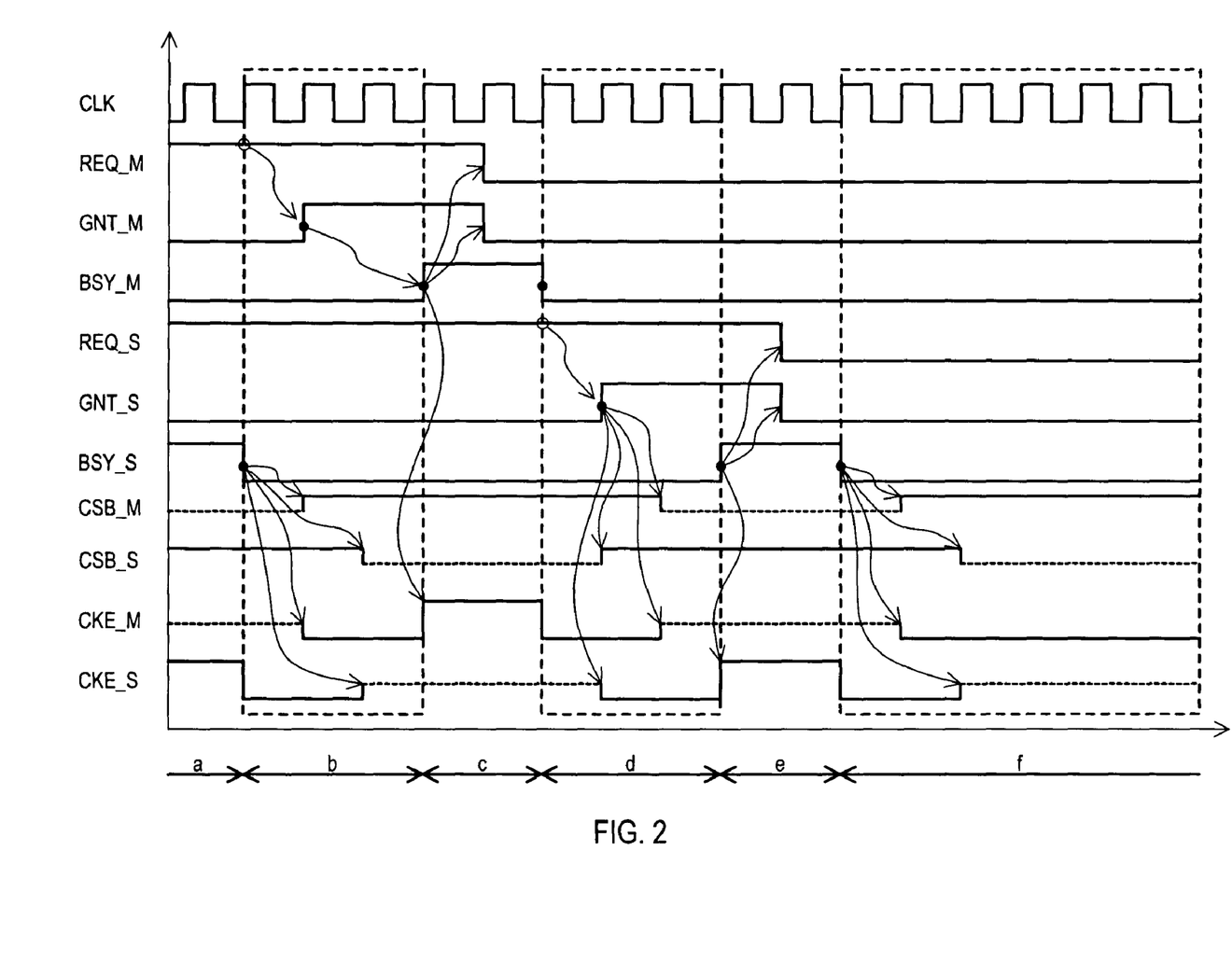
FIG. 2 is a timing diagram showing the response of various signals during the operation of a data processing apparatus like that of FIG. 1.

Referring now to FIG. 2, the operation of a data processing apparatus according to an embodiment of the present invention will be described. In the following description, it is assumed that data processing circuit 202-1 is set to be a master device, while data processing circuit 202-2 is set to be a slave device. Further, for the most part, signals identified by a trailing "_S" indicate a signal supplied from a slave device, and signals identified by a trailing "_M" indicate a signal supplied from a master device.

FIG. 2 shows various time periods "a" to "f".

In a time period "a", a data processing circuit 202-2 on a slave side can be processing data while in communication with the SDRAM 201. A requester 206-2 on the slave side can supply arbiter 205-1 on the master side with a busy signal BSY_S by way of switch 209-2 and switch 210-1. This indicates that data processing circuit 202-2 on a slave side is processing. In addition, data processing circuit 202-2 can provide a clock enable signal CKE_S, indicating that a clock signal is enabled, and a chip select signal CSB_S, indicating whether a command signal and address signal are enabled.

In a time period "b", processing for a slave data processing circuit 202-2 can end, and processing can migrate from a slave data processing circuit 202-2 to a master data processing circuit 202-1. When processing for the slave data processing circuit 202-2 ends, a controller 208-2 can supply requester 206-2 and I/F circuit 207-2 with an end signal END. A requester 206-2, after receiving an END signal, can set busy signal BSY_S to inactive (low, in this example). I/F circuit 207-2, after receiving an END signal, can set a clock enable signal CKE_S to inactive (low, in this example).

An arbiter 205-1 on a master side can respond to the inactive state of the busy signal BSY_S to supply a grant signal GNT_M. Grant signal GNT_M can be based on a request signal REQ_M on a master side. It is understood that request signal REQ_M from a master side will have priority over a request signal REQ_S from a slave side.

Referring still to time period "b" of FIG. 2, one clock cycle following the transition of busy signal BSY_S to an inactive state, I/F circuit 207-1 on a master side can set a chip select signal CSB_M from the master side to a high level, and can set a clock enable signal CKE_M to low level.

Then, two clock cycles following the transition of busy signal BSY_S to an inactive state, I/F circuit 207-2 on a slave side can set a chip select signal CSB_S and clock enable signal CKE_S to a high impedance (hi-Z) state (i.e., outputs on a slave side that provide such signals can be set to a hi-Z state).

Two clock cycles after receiving grant signal GNT_M, requester 206-1, on the master side, can activate busy signal BSY_M.

In this way, a chip select signal CSB_S and clock enable signal CKE_S, provided from a slave side, can be set to a hi-Z state after a chip select signal CSB_M and clock enable signal CKE_M, provided from a master side, have been set in response to the busy signal BSY_S from the slave side. In such an arrangement, a clock enable signal and chip select signal on a system bus connected with an SDRAM never enter and undefined state when processing migrates from a slave device to a master device.

It is noted that when clock enable signals CKE are at a low level, that is when clock enable signals CKE_S and CKE_M are both at a low level, an SDRAM can be placed in a standby mode, and hence consumes less power.

In a time period "c", a request from a master device is received for processing. A grant signal GNT_M on a master side is set to an inactive state one clock cycle after a busy signal BSY_M on the master side is activated. At this time, if there is a following request for the master device, request signal REQ_M can remain active. If there is not a following request, a request signal REQ_M can be set to an inactive state.

In a time period "d", processing migrates from a master data processing circuit 202-1 to a slave data processing circuit 202-2 after master data processing circuit 202-1 has ended processing operations. A controller 208-1 supplies an end signal END in response to the end of processing on the master side. After receiving an end signal, requester 206-1 sets busy signal BSY_M to an inactive level (low, in this example). In addition, I/F circuit 207-1 can set a clock enable signal CKE_M to a low level.

Referring still to time period "d" of FIG. 2, in response to busy signal BSY_M from a master side transitioning to an inactive state, a slave side can generate a request signal REQ_S. Arbiter 205-1 on the master side supplies a grant signal GNT_S. In response to grant signal GNT_S, I/F circuit 207-2 on the slave side can set a chip select signal CSB_S to a high level, and sets a clock enable signal CKE_S to a low level.

Then, on the master side, I/F circuit 207-1 can set a chip select signal CSB_M and clock enable signal CKE_M to a hi-Z state, one clock cycle after the grant signal GNT_S on the slave side transitions to an active level. Requester 206-2 on the slave side supplies arbiter 205-1 with a busy signal BSY_S through switch 209-2 and switch 210-1. This can indicate that data processing circuit 202-2 will begin processing two cycles after receiving grant signal GNT_S.

In this way, when processing migrates from a master device to a slave device, chip select signal CSB_S and clock enable signal CKE_S on a slave side are set to high and low levels, respectively, in response to grant signal GNT_S one clock cycle after busy signal BSY_M on the master side becomes inactive. Further, both a chip select signal CSB_M and clock enable signal CKE_M on a master side are set to a hi-Z state two clock cycles after busy signal BSY_M on the master side becomes inactive. In this way, any period in which a chip select signal CSB and clock enable signal CKE are undefined can be eliminated.

In a time period "e", a data processing circuit 202-2 on a slave side can be processing data. A grant signal GNT_S for a slave side can be set to an inactive state one clock cycle after busy signal BSY_S transitions to the active state. At this time, if there is a following request for the slave device, request signal REQ_S can remain active. If there is not a following request, a request signal REQ_S can be set to an inactive state.

In a time period "f", data processing by a data processing circuit 202-2 on a slave side can be completed. Further, no request signals for either the master or slave side are supplied thereafter. When processing by a data processing circuit 202-2 on the slave side ends, controller 208-2 can supply requester 206-2 and I/F circuit 207-2 with an end signal END.

After receiving an end signal END, requester 206-2 can set busy signal BSY_S to an inactive level (low, in this example), and I/F circuit 207-2 can set clock enable signal CKE_S to an inactive level (low, in this example). Because request signals from the master side and slave side are not active, one clock cycle after the busy signal BSY_S on the slave side becomes inactive, I/F circuit 207-1 on the master side can set chip select signal CSB_M to a high level and set clock enable signal CKE_M to a low level. Two clock cycles after the busy signal BSY_S on the slave side becomes inactive, I/F circuit 207-2 on the slave side can set chip select signal CSB_S and clock enable signal CKE_S to a hi-Z state.

It is possible to eliminate any period in which a chip select signal and/or a clock enable signal on a system bus are undefined by setting a chip select signal CSB_M to a high level and setting a clock enable signal CKE_M to a low level with I/F circuit 207-1 when no request signal is received from a slave or master side after processing on the slave side has ended.

Furthermore, it can be possible to eliminate a period in which a chip select signal and/or a clock enable signal are undefined by maintaining the state shown at the beginning of time period "d" in FIG. 2. Namely, a state can be maintained in which a chip select signal CSB_M on a master side is at a high level, and a clock enable signal CKE_M on a master side is at a low level, until a request is received from either slave or master side.

The above embodiment can have advantageous effects. After a data processing circuit ends processing, a time period in which a clock enable signal and/or chip select signal may be undefined can be eliminated. Such an advantageous result can occur both if a data processing circuit accesses a SDRAM for next processing in response to a request signal, and if no request signal follows and no subsequent access occurs.

As a result, according to the above embodiment, a bus control circuit on a system bus 203 may not be provided, as in the conventional case. Thus, circuit scale can decrease and/or access speed between a data processing circuit and an SDRAM 201 can increase. Furthermore, a chip select signal, clock enable signal, request signal, grant signal, busy signal, and corresponding terminals are conventionally used and included in processors. Thus, such signals can be used in the above described control arrangement without having to provide additional control terminals on the data processing circuits (e.g., 202-1 and 202-2).

Additionally, in data processing apparatus 200 of the embodiment described above, a slave data processing circuit, which is not supplying a request signal REQ_S upon initialization, can supply a busy signal REQ_S for a predetermined period upon receiving a grant signal GNT_S. In this way, a master data processing circuit 202-1 can confirm a start up of the data processing circuit on a slave side based on communication by a grant signal GNT_S and request signal REQ_S.

The above description has illustrated but one embodiment. The present invention should not be construed as being limited to such an embodiment, as the invention may subject to different variations without departing from the spirit and scope of the invention. For example, while the embodiment above has described a case in which two data processing circuits (202-1 and 202-2) are connected to one DDR-SDRAM 201, three or more such data processing circuits could be connected to such a DDR-SDRAM.

Furthermore, the above example has described an arrangement in which two data processing circuits (202-1 and 202-2) are formed of the same structure, and a data processing circuit 202-1 with an enabled arbiter circuit 205-1 is initialized to be a master device. However, the present invention anticipates alternate arrangements. As but a two examples, it is possible to fix one data processing circuit with an enabled arbiter circuit as a master device, or it is possible to set only one of multiple data processing circuits as a master device, and to provide such a device with an arbiter circuit.

Still further, the above example has illustrated an arrangement in which an arbiter circuit (205-1 or 205-2) is built into a data processing device (202-1 and 202-2). However, as but one alternative, a structure may be provided that includes multiple data processing circuits and an arbiter circuit formed independently of one another, but in communication with one another.

Note, in some arrangements, it may be necessary to have an arbiter circuit that is built into a data processing circuit, so that such a data processing circuit can serve as a master device that confirms the start up of a slave device by signal communication, as described above.

Along these same lines, it may be preferable that an arbiter circuit 205-1 be built into a master data processing circuit 202-1, so that a master data processing circuit 202-1 can maintain DDR-SDRAM 201 control signals in determined states by communication of only a grant signal, request signal, and busy signal, when both data processing circuits cease processing (e.g., go into a sleep mode).

Alternatively, in arrangements in which multiple data processing circuits and an arbiter circuit are formed independently of one another, it can be preferable to notify a master device of a busy signal from a slave device through a predetermined signal wiring, or the like, so that a master can maintain the state of a DDR-SDRAM when the data processing circuits cease processing (e.g., go into a sleep mode).

The particular embodiment above has shown an arrangement in which a data processing circuit that is ending processing has a busy signal that transitions to an inactive level. One clock cycle after, a data processing circuit that is starting processing sets its chip enable signal and clock enable to inactive states (e.g., high and low, respectively). Two cycles after, the data processing circuit that is ending processing sets its chip enable signal and clock enable to a hi-Z state. However, such a particular arrangement should not be construed as limiting. Processing may be conducted according to different timing arrangements provided the chronological order of the various control signals described above is maintained.

Furthermore, the above example has shown an arrangement in which a clock enable signal is set to an inactive level (e.g., low), and control of an SDRAM 201 migrates from a data processing circuit which has ended processing to a data processing circuit that is starting processing. However, when a clock enable is set to an inactive level, an SDRAM 201 can be temporarily placed into a lower power consumption mode (standby mode). Thus, alternate implementations of the present invention can include placing such a clock enable signal to an active level (e.g., high) in such situations. This can provide faster response speeds.

More particularly, a data processing circuit that has ended processing can maintain a clock enable signal at an active level (e.g., high) until another data processing circuit provides a clock enable signal at the active level (e.g., high). Of course, it is understood that it is necessary to fix a clock enable signal for a data processing circuit that ending processing and a data processing that is beginning processing so that both such signals are either a low level or high level, to prevent such signals from being different from one another.

The above embodiments have described arrangements in which a data processing circuit that ends the control of a semiconductor memory circuit supplies a clock enable signal and chip select signal at predetermined levels. Before such a data processing circuit ends control of the semiconductor memory circuit, a data processing circuit that is starting control of the semiconductor memory circuit drives the clock enable signal and chip select signal to the same predetermined levels. Thus, a clock enable signal and/or chip enable signal provided externally to the semiconductor memory circuit may not enter an undefined state. As a result, potential malfunctions of the semiconductor memory circuit can be prevented. Further, because a bus control circuit needed for conventional approaches may not be necessary, a resulting circuit size can be reduced and/or response speed can increase.

It is again noted that while the various embodiments set forth herein have been described in detail, the present invention could be subject to various changes, substitutions, and alterations without departing from the spirit and scope of the invention. Accordingly, the present invention is intended to be limited only as defined by the appended claims.

What is claimed is:

1. A data processing apparatus that arbitrates sharing of a single semiconductor memory circuit among multiple data processing circuits, comprising:
a semiconductor memory circuit that executes operations corresponding to a command signal, address signal and clock signal received external to the semiconductor memory circuit, the semiconductor memory circuit includes a clock enable signal input, and a chip select signal input; and
a data processing circuit that supplies the semiconductor memory circuit with a first clock enable signal output to the clock enable signal input for enabling an input of the clock signal when active and disabling the input of the clock signal when inactive, and a first chip select signal output to the chip select signal input for enabling input of command signals when the chip select signal is active and disabling input of command signals when the chip select signal is inactive; wherein
before the data processing circuit ends control of the semiconductor memory circuit and stops supplying the first clock enable signal output and first chip select signal output, a different data processing circuit starting control of the semiconductor memory circuit supplies the semiconductor memory circuit with a second clock enable signal output to the clock enable signal input and a second chip enable signal output to the chip enable signal input, the second clock enable signal output and the second chip enable signal output having clock enable signal and chip select signal logic values at the same state as the first clock enable signal output and the first chip enable signal output provided by the data processing circuit ending control of the semiconductor memory circuit.

2. The data processing apparatus of claim 1, wherein:
the data processing circuit supplies a sharing arbitration circuit with a request when requesting control of the semiconductor memory circuit, controls the semiconductor memory circuit in response to a grant signal, and supplies the arbitration circuit with a busy signal while controlling the semiconductor memory circuit;
when ending control of the semiconductor memory circuit, the data processing circuit stops supplying the first clock enable signal output and first chip select signal output a predetermined time after stopping the supply of the busy signal; and
the sharing arbitration circuit generates the grant signal in response the request signal before the predetermined time has elapsed.

3. The data processing apparatus of claim 1, wherein:
the semiconductor memory circuit enters a lower power state when the clock enable signal is inactive, as compared to when the clock enable signal is active.

4. The data processing apparatus of claim 1, wherein:
one of the multiple data processing circuits is a master device while any others are slave devices; and
the master device supplies the clock enable signal output and chip select signal output to the semiconductor memory circuit when none of the slave devices provides the clock enable signal output and chip select signal output to the semiconductor memory circuit.

5. The data processing apparatus of claim 1, wherein:
the multiple data processing circuits are connected to one another but formed independently of one another.

6. The data processing apparatus of claim 2, wherein:
one of the multiple data processing circuits is a master device while any others are slave devices; and
the sharing arbitration circuit is built into the master device.

7. The data processing apparatus of claim 1, wherein:
each of the data processing circuits of the multiple data processing circuits includes a built in sharing arbitration circuit;
the multiple data processing circuits are initialized to establish one data processing circuit as a master device and all others as slave devices; and
the arbitration circuit of the master device is enabled and the arbitration circuits of the slave devices are disabled.

8. The data processing apparatus of claim 7, wherein:
in an initialization operation, the sharing arbitration circuit built into the master device supplies at least one slave device with a grant signal; and
the at least one slave device supplies a request signal of a predetermined time period if the grant signal is received while the slave device is not supplying its own request signal; wherein
the sharing arbitration circuit built into the master device stops supplying the grant signal once the startup of the at least one slave device is confirmed by input of the request signal from the at least one slave device.

9. A data processing apparatus, comprising:
a semiconductor memory circuit that is controlled by control signal inputs to at least one control input;
at least one control line coupled to the at least one control input of the semiconductor memory circuit; and
a plurality of data processing circuits that share access to the semiconductor memory circuit, each data processing circuit having a control output coupled to the at least one control line; wherein
when one data processing circuit ends control of the semiconductor memory circuit, the data processing circuit provides a control signal at the control output at a predetermined potential for a first time period before ending the control signal; and
subsequently, when another data processing circuit starts control of the semiconductor memory circuit, the another data processing circuit provides a control signal at its control output at the predetermined potential within the first time period
wherein each of the plurality of data processing curcuits includes
a request input/output (I/O) for indicating when the data processing circuit seeks control of the semiconductor memory circuit,
a grant I/O for indicating when the data processing circuit is granted control of the semiconductor memory circuit,
a busy I/O for indicating when the data processing circuit is controlling the semiconductor memory circuit,
a first switch for selectively connecting the request I/O, grant I/O, and busy I/O to a requesting circuit that generates a request indication and busy indication for the data processing circuit, and a second switch for selectively connecting the request I/O, grant I/O, and busy I/O to an arbitration circuit that generates a grant indication; wherein the first switch is disabled and the second switch is enabled when the data processing circuit is initialized as a master device, and the first switch is enabled and the second switch is disabled when the data processing circuit is initialized as a slave device.

10. The data processing apparatus of claim 9, wherein:

the semiconductor memory circuit operates in synchronism with a clock signal, and the at least one control input includes a chip select input that enables the processing of commands by the semiconductor memory circuit, and a clock enable signal that enables generation of timing signals within the semiconductor memory circuit.

11. The data processing apparatus of claim 9, wherein:

each data processing circuit includes a controller that generates at least one controller signal for enabling or disabling the first switch and second switch according to initialization data.

12. The data processing apparatus of claim 9, wherein:

the at least one control line is directly connected to the control input of the semiconductor memory circuit and the control output of each of the plurality of data processing circuits.

* * * * *